United States Patent
Srinivasan (10) Patent No.: US 10,003,526 B1
(45) Date of Patent: *Jun. 19, 2018

(54) METHODS AND APPARATUS FOR EFFICIENT USE OF LINK AGGREGATION GROUPS

(71) Applicant: Juniper Networks, Inc., Sunnyvale, CA (US)

(72) Inventor: Shriram Srinivasan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 134 days.

This patent is subject to a terminal disclaimer.

(21) Appl. No.: 14/869,278

(22) Filed: Sep. 29, 2015

Related U.S. Application Data (63) Continuation of application No. 13/908,310, filed on Jun. 3, 2013, now Pat. No. 9,154,371.

(51) Int. Cl.
| | | |
|---|---|---|
| *H04L 12/709* | (2013.01) | |
| *H04L 12/803* | (2013.01) | |
| *H04L 12/24* | (2006.01) | |

(52) U.S. Cl.
CPC .......... *H04L 45/245* (2013.01); *H04L 47/125* (2013.01); *H04L 41/00* (2013.01)

(58) Field of Classification Search
None
See application file for complete search history.

(56) References Cited

U.S. PATENT DOCUMENTS

| | | | | |
|---|---|---|---|---|
| 2003/0061533 | A1* | 3/2003 | Perloff | H04L 1/22 714/4.3 |
| 2008/0112312 | A1* | 5/2008 | Hermsmeyer | H04L 45/00 370/228 |
| 2011/0268115 | A1 | 11/2011 | Attarwala et al. | |
| 2012/0033541 | A1* | 2/2012 | Da Silva | H04L 45/245 370/217 |
| 2012/0170575 | A1* | 7/2012 | Mehra | H04L 41/00 370/359 |

(Continued)

OTHER PUBLICATIONS

"Understanding Multicast Load Balancing Over 10-Gigabit Links for Routed Multicast Traffic on Switches," Juniper Networks [online] published Jun. 19, 2012, 4 pgs., Retrieved from the Internet <URL: http://www.juniper.net/techpubs/en_US/junos12.2/topics/concept/aggregated-ethernet-load-balancing-for-routed-multicast.html>.

*Primary Examiner* — Kodzovi Acolatse
(74) *Attorney, Agent, or Firm* — Cooley LLP (57) ABSTRACT

An apparatus includes a first edge device configured to receive a data unit destined to a peripheral processing device that is operatively coupled to a network interconnect via a LAG associated with a second edge device and a third edge device. The first edge device is configured to select an edge device set that includes the third edge device and excludes the second edge device, from a group of edge device sets. Each edge device set from the group of edge device sets is directly coupled to the peripheral processing device. The first edge device is configured to send an instance of the data unit to each edge device from the edge device set such that the third edge device sends an instance of the data unit to the peripheral processing device based on a selection method that omits ports on the second edge device as potential selections.

18 Claims, 4 Drawing Sheets

(56) References Cited

U.S. PATENT DOCUMENTS

2012/0182866 A1* 7/2012 Vinayagam ........... H04L 45/245
 370/228
2013/0121141 A1* 5/2013 Hao .................... H04L 41/0663
 370/228

* cited by examiner

Receive, at a first edge device from a set of edge devices within a network, a data unit to be sent to a set of peripheral processing devices.
302

Select, at the first edge device, an edge device set from a group of edge device sets, the edge device set including a second edge device from the set of edge devices and not including a third edge device from the set of edge devices.
304

Send an instance of the data unit to each edge device from the edge device set such that the second edge device sends an instance of the data unit to a peripheral processing device from the set of peripheral processing devices via a port from the set of ports on the second edge device based on a selection method that omits the ports from the set of ports on the third edge device as potential selections.
306

```
┌─────────────────────────────────────────────────────┐
│ Receive, at a first edge device and from a second   │
│ edge device, a data unit (1) to be sent to a        │
│ peripheral processing device and (2) having an      │
│ identifier associated with an edge device set that  │
│ includes the first edge device.                     │
│                        402                          │
└─────────────────────────────────────────────────────┘
                          │
                          ▼
┌─────────────────────────────────────────────────────┐
│ Select, based on the identifier, a selection method │
│              from a set of selection methods.       │
│                        404                          │
└─────────────────────────────────────────────────────┘
                          │
                          ▼
┌─────────────────────────────────────────────────────┐
│ Select, using the selection method, a port to send  │
│                   the data unit to.                 │
│                        406                          │
└─────────────────────────────────────────────────────┘
                          │
                          ▼
┌─────────────────────────────────────────────────────┐
│ Send, from the first edge device, the data unit to  │
│ the peripheral processing device if a port from the │
│ set of ports of the first edge device is selected   │
│ using the selection method.                         │
│                        408                          │
└─────────────────────────────────────────────────────┘
```

FIG. 4

METHODS AND APPARATUS FOR EFFICIENT USE OF LINK AGGREGATION GROUPS

CROSS-REFERENCE TO RELATED APPLICATIONS

This application is a continuation of U.S. patent application Ser. No. 13/908,310, filed Jun. 3, 2013 and titled "Methods and Apparatus for Efficient Use of Link Aggregation Groups," now U.S. Pat. No. 9,154,371, which is incorporated herein by reference in its entirety.

BACKGROUND

Some embodiments described herein relate generally to link aggregation group (LAG)-based multipath networks, and, in particular, to methods and apparatus for distributing traffic across a LAG in a network.

Some known LAG-based networks distribute traffic through a LAG of the network by flooding the traffic to each member node of the LAG to achieve load balancing. The traffic, however, is typically forwarded to the destination through only one port of a member node of the LAG, and dropped at each of the remaining member nodes (i.e., non-forwarding member nodes) of the LAG. Thus, network bandwidth is wasted in flooding the traffic to each member node of the LAG.

Accordingly, a need exists for methods and apparatus that can reduce bandwidth wastage and still achieve load balancing across links of a LAG in traffic distribution.

SUMMARY

An apparatus includes a first edge device configured to receive a data unit destined to a peripheral processing device that is operatively coupled to a network interconnect via a LAG associated with a second edge device and a third edge device. The first edge device is configured to select an edge device set that includes the third edge device and excludes the second edge device, from a group of edge device sets. Each edge device set from the group of edge device sets is directly coupled to the peripheral processing device. The first edge device is configured to send an instance of the data unit to each edge device from the edge device set such that the third edge device sends an instance of the data unit to the peripheral processing device based on a selection method that omits ports on the second edge device as potential selections.

DETAILED DESCRIPTION

In some embodiments, an apparatus includes a first edge device from in a set of edge devices. The first edge device is operatively coupled to the remaining edge devices from the set of edge devices via a network interconnect. Such a network interconnect can include, for example, at least one distributed multi-stage switch. The first edge device is configured to receive a data unit associated with a multicast group and to be sent to a peripheral processing device from a set of peripheral processing devices. The peripheral processing device is included in the multicast group. The peripheral processing device is operatively coupled to the network interconnect via a link aggregation group (LAG) associated with a set of ports on a second edge device from the set of edge devices and a set of ports on a third edge device from the set of edge devices.

The first edge device is configured to select, in response to receiving the data unit, an edge device set from a group of edge device sets associated with the multicast group. The selected edge device set includes the third edge device and excludes the second edge device. Each edge device set from the group of edge device sets can be associated with the multicast group. Each edge device set from the group of edge device sets collectively is directly coupled to each peripheral processing device from the set of peripheral processing devices. Each edge device set from the group of edge device sets is different than the remaining edge device sets from the group of edge device sets.

The first edge device is configured to send an instance of the data unit to each edge device associated with the edge device set such that the third edge device sends an instance of the data unit to the peripheral processing device via a port from the set of ports on the third edge device based on a selection method that omits the ports from the set of ports on the second edge device as potential selections. In some instances, the selection method can include a hash function with the ports from the set of ports on the third edge device being the potential selections and not the set ports on the second edge device as the potential selections.

In some instances, the first edge device can be configured to amend, prior to sending the instance of the data unit and based on selecting the edge device set from the group of edge device sets, the instance of the data unit to include an identifier associated with the edge device set. In such instances, the first edge device can be configured to send the instance of the data unit including the identifier to each edge device from the edge device set such that the third edge device selects the selection method from a set of selection methods based at least in part on the identifier.

In some embodiments, an apparatus includes a first edge device from a set of edge devices. In some instances, the first edge device can be configured to be coupled to the remaining edge devices from the set of edge devices via, for example, at least one distributed multi-stage switch. The first edge device has a set of ports configured to be associated with a LAG. The LAG also includes a set of ports on a second edge device from the set of edge devices. The LAG operatively couples a peripheral processing device with the first edge device (via the set of ports of the first edge device) and the second edge device (via the set of ports of the second edge device).

The first edge device is configured to receive, from a third edge device, a data unit to be sent to the peripheral processing device. The data unit includes an identifier associated with an edge device set that includes the first edge device. In some instances, the data unit can be a multicast data unit associated with a multicast group that includes the peripheral processing device.

When the edge device set does not include the second edge device, the first edge device is configured to select a port from the set of ports of the first edge device based on a first selection method that omits the set of ports of the second edge device as potential selections. In some instances, the first selection methods includes a hash function having each port from the set of ports on the first edge device as the potential selections and not the set ports on the second edge device as the potential selections.

When the edge device set includes the second edge device, the first edge device is configured to select a port from the set of ports of the first edge device or a port from the set of ports of the second edge device based on a second selection method. The second selection method includes each port from the set of ports of the first edge device and each port from the set of ports of the second edge device as potential selections. In some instances, the second selection method includes a hash function having each port from the set of ports on the first edge device and each port from the set of ports on the second edge device as potential selections.

The first edge device is further configured to send the data unit to the peripheral processing device if a port from the set of ports of the first edge device is selected based on the first selection method or the second selection method.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

As used herein, the singular forms "a," "an" and "the" include plural referents unless the context clearly dictates otherwise. Thus, for example, the term "a route selection module" is intended to mean a single module or multiple modules configured to perform functions associated with routing data.

Figure 1:
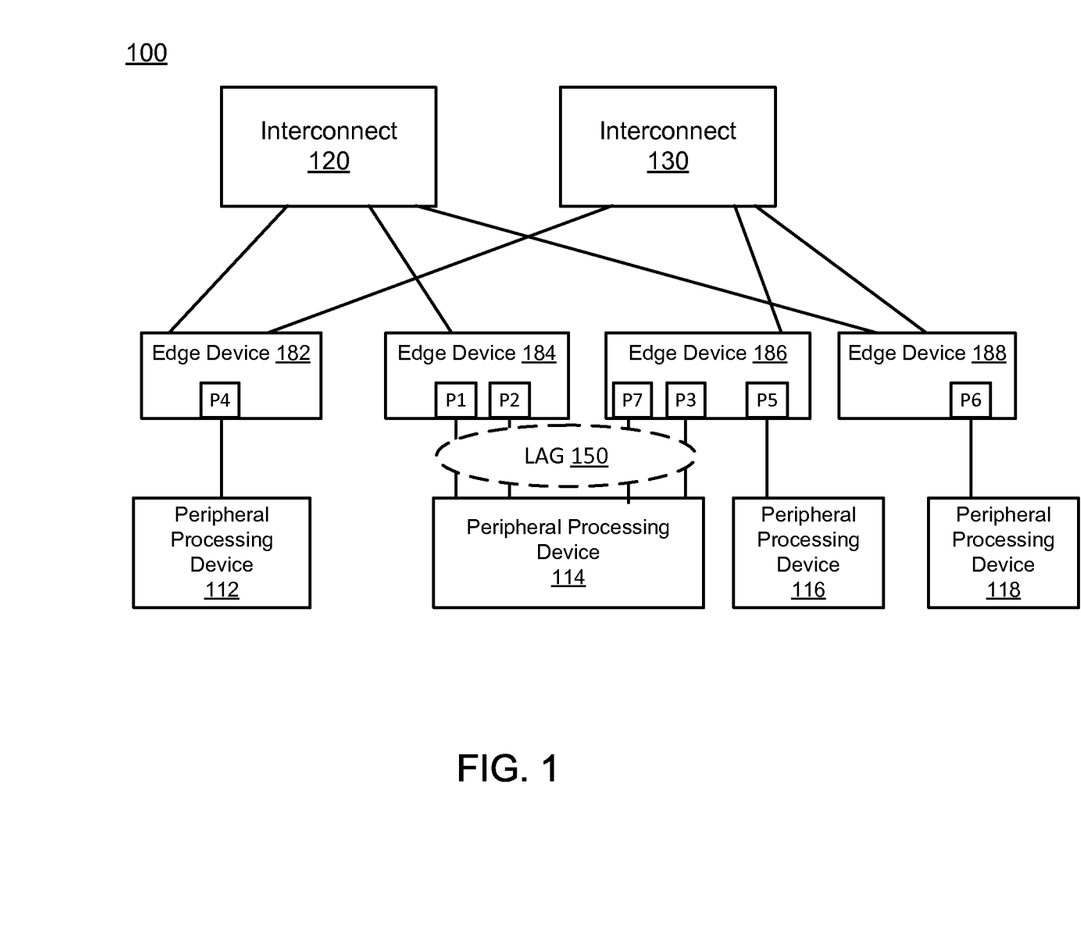
FIG. 1 is a schematic illustration of a LAG-based network, according to an embodiment.

FIG. 1 is a schematic illustration of a LAG-based network 100, according to an embodiment. As shown in FIG. 1, the network 100 includes one or more interconnects (e.g., interconnects 120, 130) and a set of edge devices (e.g., edge devices 182, 184, 186, 188). An edge device included in the network 100 can be operatively coupled to another edge device included in the network 100 via the interconnect(s) included in the network 100. For example, as shown in FIG. 1, the edge device 182 is operatively coupled to the edge device 184 via the interconnect 120, and operatively coupled to the edge devices 186 and 188 via the interconnect 130. In some embodiments, the network 100 can include more or less interconnects and/or edge devices than those shown in FIG. 1. In some embodiments, the network 100 can include other types of devices, modules and/or components (not shown in FIG. 1, e.g., a network control device, a user interface module, etc.) associated with performing data distribution and switching functions.

In some embodiments, each edge device can be connected to one or more peripheral processing devices (e.g., peripheral processing devices 112, 114, 116, 118) via one or more ports (e.g., ports P1-P7) of that edge device. For example, as shown in FIG. 1, the edge device 182 is connected to the peripheral processing device 112 via the port P4; the edge device 184 is connected to the peripheral processing device 114 via the ports P1 and P2; the edge device 186 is connected to the peripheral processing device 114 via the ports P3 and P7, and connected to the peripheral processing device 116 via the port P5; and the edge device 186 is connected to the peripheral processing device 118 via the port P6.

An interconnect (e.g., the interconnect 120 or 130) within the network 100 can be any device or combination of devices that can be used to redirect data (e.g., data packets, data cells, data frames, etc.) as the data flows through the network 100. In some embodiments, such an interconnect can be a single networking device such as, for example, a router, a switch, and/or the like. In some other embodiments, an interconnect within the network 100 can include multiple networking devices. Such an interconnect can be, for example, a switch fabric including multiple switching devices. For example, the interconnect 120 can be a single consolidated switch (e.g., a single large-scale consolidated L2/L3 switch). For another example, the interconnect 130 can be a switch fabric having multiple switches. Furthermore, in some embodiments, interconnects within the network 100 can be coupled to each other such that an edge device can be operatively coupled to another edge device via multiple interconnects.

In some embodiments, one or more interconnects (e.g., the interconnects 120, 130) within the network 100 can include and/or implement a switch fabric including multiple switching devices. The switch fabric within the network 100 can be any suitable switch fabric that operatively couples the edge devices (e.g., the edge devices 182-188) connected to the interconnect(s) of the network 100 to the other edge devices via multiple data paths. In some embodiments, for example, the switch fabric within the network 100 can be a Clos network (e.g., a non-blocking Clos network, a strict sense non-blocking Clos network, a Benes network) having multiple stages of switch modules (e.g., integrated Ethernet switches). In some embodiments, the switch fabric within the network 100 can be, for example, a portion of a data center fabric (DCF).

In some embodiments, the switch fabric within the network 100 can be configured to operate as a single logical entity (e.g., a single logical network element). Similarly stated, the switch fabric can be part of a single logical hop between a first edge device (e.g., the edge device 182-188) and a second edge device (e.g., the edge device 182-188). The switch fabric within the network 100 can be configured to connect (e.g., facilitate communication between) the peripheral processing devices 112-118. In some embodiments, the switch fabric within the network 100 can be configured to communicate via interface devices (not shown in FIG. 1) that are configured to transmit data at a rate of at least 10 Gb/s. In some embodiments, the switch fabric can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

In some embodiments, the implementation of the switch fabric within the network 100 can be highly distributed within the interconnect(s), for example, for reliability. For example, portions of the switch fabric can be physically distributed across, for example, many chassis. In some embodiments, for example, a stage of the switch fabric can be included in a first chassis and another stage of the switch fabric can be included in a second chassis. Both of the stages can logically function as part of a single consolidated switch (e.g., within the same logical hop) but have a separate single physical hop between respective pairs of stages. Thus, the interconnect(s) within the network 100 can implement and/or function as a distributed multi-stage switch fabric.

An edge device (e.g., the edge device 182, 184, 186 or 188) within the network 100 can be any type of device that can be used to couple a peripheral processing device (e.g., the peripheral processing device 112-118) to the network 100. Such an edge device can enable data transmission between the peripheral processing device(s) connected to the edge device and peripheral processing devices connected to other edge devices of the network 100. In some embodiments, for example, the edge devices 182-188 can be access switches, input/output modules, top-of-rack (TOR) devices, and/or the like. Structurally, the edge devices 182-188 can function as source edge devices and/or destination edge devices. Accordingly, the edge devices 182-188 can send data (e.g., data packets, data cells, data frames, etc.) to and/or receive data from the remaining portion (e.g., the interconnects 120, 130) of the network 100, and to and/or from the connected peripheral processing devices 112-118. In some embodiments, the edge device 182-188 can be a combination of hardware modules and software modules (stored and/or executing in hardware). In some embodiments, for example, each edge device 182-188 can include a field-programmable gate array (FPGA), an application specific integrated circuit (ASIC), a digital signal processor (DSP), and/or the like.

Each edge device 182-188 is configured to communicate with the other edge devices 182-188 via the interconnects (e.g., the interconnects 120, 130) of the network 100. Specifically, the interconnects are configured to provide any-to-any connectivity between the edge devices 182-188 at relatively low latency. For example, the interconnect 120 can be configured to transmit (e.g., convey) data between the edge devices 182, 184 and 188. In some embodiments, the interconnects within the network 100 can have at least hundreds or thousands of ports (e.g., egress ports and/or ingress ports) through which the edge devices 182-188 can transmit and/or receive data. In some embodiments, each edge device 182-188 can be configured to communicate with the other edge devices 182-188 over multiple data paths. More specifically, in some embodiments, multiple data paths containing different sets of switches exist within the network 100, between a first edge device and a second edge device.

In some embodiments, the edge devices 182-188 can include one or more network interface devices (e.g., a 40 Gigabit (Gb) Ethernet interface, a 100 Gb Ethernet interface, etc.) through which the edge devices 182-188 can send signals to and/or receive signals from the interconnects 120, 130. The signals can be sent to and/or received from the interconnects 120, 130 via, for example, an electrical link, an optical link, a wireless link, and/or any other suitable link operatively coupled to the edge devices 182-188. In some embodiments, the edge devices 182-188 can be configured to send signals to and/or receive signals from the interconnects 120, 130 based on one or more protocols (e.g., an Ethernet protocol, a multi-protocol label switching (MPLS) protocol, a Fibre Channel (FC) protocol, a Fibre-Channel-over Ethernet (FCoE) protocol, an Infiniband-related protocol, a cell-based protocol, etc.). Details of an edge device are shown and further described with respect to FIG. 2.

The peripheral processing devices 112-118 can be any type of device that can communicate and enable data transmission with other peripheral processing devices 112-118 via the network 100. Specifically, the peripheral processing devices 112-118 can be coupled to the edge devices 182-188, and send data (e.g., data packets, data cells, data frames, etc.) to and/or receive data from the edge devices 112-118. The peripheral processing devices 112-118 can include, for example, compute nodes, service nodes, routers, and storage nodes, etc. In some embodiments, for example, the peripheral processing devices 112-118 include servers, storage devices, gateways, workstations, and/or the like.

The peripheral processing devices 112-118 can be operatively coupled to the edge devices 182-188 of the network 100 using any suitable connection such as, for example, an optical connection (e.g., an optical cable and optical connectors), an electrical connection (e.g., an electrical cable and electrical connectors), a wireless connection (e.g., a transceiver and antenna), and/or the like. In some embodiments, the connection between a peripheral processing device 112-118 and an edge device 182-188 can be a direct link. Such a link can be referred to as a single physical hop link. In other embodiments, a peripheral processing device 112-118 can be operatively coupled to one or more edge devices 182-188 via one or more intermediary modules (not shown in FIG. 1). Such a connection can be referred to as a multiple physical hop link.

In some embodiments, a peripheral processing device can have a LAG-based connectivity (e.g., LAG 150) with one or multiple edge devices of the network 100. In some instances, a LAG can include links that span within a single edge device. In other instances, a LAG can include links that span across multiple edge devices. For example, as shown in FIG. 1, the peripheral processing device 114 is connected to the edge devices 184 and 186 based on the LAG 150. Specifically, the LAG 150 includes the links connecting the peripheral processing device 114 and the edge device 184 via the ports P1 and P2, and the links connecting the peripheral processing device 114 and the edge device 186 via the ports P3 and P7. In some embodiments, the network 100 can include more than one LAG. In some embodiments, a peripheral processing device can be connected to multiple groups of edge devices of the network 100 based on multiple LAGs.

In some embodiments, a LAG (e.g., the LAG 150) implemented in the network 100 can use multiple ports of the edge device(s) associated with the LAG to increase the logical link's bandwidth (i.e., the combined bandwidth for the links associated with the LAG) beyond the limits of a single port of an edge device, thus to increase the redundancy for higher availability in transmitting data from the edge device(s) to the peripheral processing device, and/or receiving data from the peripheral processing device at the edge device(s). In such embodiments, a LAG load balancing mechanism (e.g., a hashing-based method described below) can be used at the edge device(s) and/or the peripheral processing device to load balance traffic across different member links in the LAG. For example, the edge device 184 and/or the edge device 186 can use a hash function to select a port from the ports P1, P2, P3 and/or P7 to send a data unit (e.g., a data packet, data cell, data unit, etc.) to the peripheral processing device 114. Details of the LAG load balancing mechanism are further described below and with respect to FIGS. 3-4.

Figure 2:
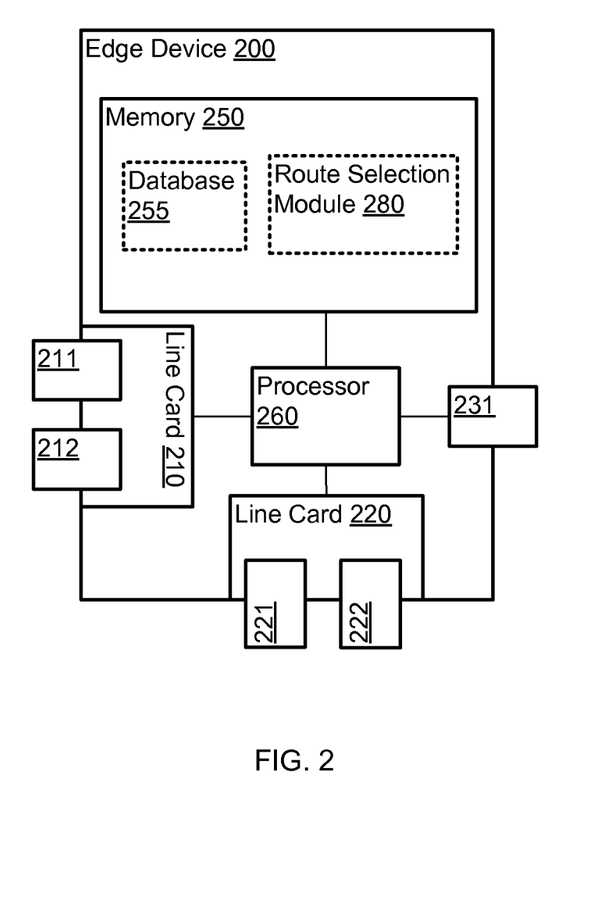
FIG. 2 is a system block diagram of an edge device, according to an embodiment.

FIG. 2 is a system block diagram of an edge device 200, according to an embodiment. The edge device 200 can be structurally and functionally similar to the edge devices 182-188 shown and described with respect to FIG. 1. Particularly, the edge device 200 can be included in a network similar to the network 100 shown and described with respect to FIG. 1. As shown in FIG. 2, the edge device 200 includes a processor 260; a memory 250, which includes a database 255 and a route selection module 280; line cards 210, 220; and a port 231.

The processor 260 is operatively coupled to the memory 250, line card 210, line card 220 and port 231. The processor 260 can be any processing device (e.g., a CPU) that can be configured to execute the route selection module 280 and control operations of the database 255, the line cards 210, 220, and the ports 211, 212, 221, 222 and 231. In some embodiments, the processor 260 can be a general purpose processor, a Field Programmable Gate Array (FPGA), an Application Specific Integrated Circuit (ASIC), a Digital Signal Processor (DSP), and/or the like. In some embodiments, although not shown in FIG. 2, the edge device 200 can include other modules such as, for example, a communication module that controls transmitting data and/or receiving data via the ports 211, 212, 221, 222 and 231. Each module (e.g., the route selection module 280) included in and executed at the edge device 200 can be a hardware-based module (e.g., a DSP, a FPGA, an ASIC), a software-based module (e.g., a module of computer code stored in hardware and executed at a processor), and/or a combination of hardware and software-based modules.

The line card 210 includes ports 211 and 212. The line card 220 includes ports 221 and 222. In some embodiments, the line cards 210 and/or 220 can include one or more processors and/or memories. In some embodiments, a port can be any entity that can actively communicate with a coupled device (e.g., the peripheral processing device 112-118 in FIG. 1) or over a network (e.g., the interconnect 120 or 130 in FIG. 1). In some embodiments, the port need not necessarily be a hardware port, but can be a virtual port or a port defined by software.

In some embodiments, the ports 211, 212, 221 and 222 can communicate with, for example, peripheral processing devices (e.g., the peripheral processing device 112-118 in FIG. 1) coupled to the edge device 200. For example, the ports 211, 212, 221 and 222 can implement a physical layer using fiber-optic signaling via fiber-optic cables. In some embodiments, some of the ports 211, 212, 221 and 222 can implement one physical layer such as fiber-optic signaling and others of the ports 211, 212, 221 and 222 can implement a different physical layer such as twisted-pair electrical signaling. Furthermore, the ports 211, 212, 221 and 222 can allow the edge device 200 to communicate with the coupled peripheral processing devices via a common protocol such as Fibre Channel or Ethernet. In some embodiments, some of the ports 211, 212, 221 and 222 can implement one protocol such as Fibre Channel and others of the ports 211, 212, 221 and 222 can implement a different protocol such as Ethernet. Thus, the edge device 200 can be in communication with multiple peripheral processing devices using homogeneous or heterogeneous physical layers and/or protocols via the ports 211, 212, 221 and 222.

In some embodiments, the port 211, 212, 221 and/or 222 can implement a LAG (e.g., the LAG 150 in FIG. 1) such that the edge device 200 is coupled to a peripheral processing device using one or more links of the LAG. For example, the ports 211, 212 can be included in a first LAG that connects the edge device 200 with a first peripheral processing device; and the port 221 can be included in a second LAG that connects the edge device 200 and another edge device with a second peripheral processing device. In such embodiments, the route selection module 280 can be configured to manage distributing data traffic across links of the LAG, as described below and with respect to FIGS. 3-4.

In some embodiments, the port 231 can be connected to a device (e.g., the interconnect 120, 130 in FIG. 1) within a communications network (e.g., the network 100 in FIG. 1), such that the edge device 200 can be operatively coupled to other devices (e.g., other edge devices) via the communications network. The port 231 can be part of one or more network interfaces (e.g., a 40 Gigabit (Gb) Ethernet interface, a 100 Gb Ethernet interface, etc.) through which the edge device 200 can send signals to and/or receive signals from the communications network. The signals can be sent to and/or received from the communications network via an optical link, an electrical link, a wireless link, and/or any other suitable link operatively coupled to the edge device 200. In some embodiments, the edge device 200 can send signals to and/or receive signals from the communications network based on one or more protocols (e.g., a FC protocol, a FCoE protocol, an Ethernet protocol, a MPLS protocol, an Infiniband-related protocol, etc.).

In some embodiments, the port 231 can implement a different physical layer and/or protocol than those implemented at the ports 211, 212, 221 and 222. For example, the ports 211, 212, 221 and 222 can communicate with peripheral processing devices using a protocol based on data packets and the port 231 can communicate via a switch fabric (e.g., the switch fabric within the network 100 as described with respect to FIG. 1) using a protocol based on data cells. Said differently, the edge device 200 can be an edge device of a network switch such as a distributed network switch.

In some embodiments, the memory 250 can be, for example, a random-access memory (RAM) (e.g., a dynamic RAM, a static RAM), a flash memory, a removable memory, and/or so forth. The database 255 can be, for example, a relational database or any other type of database. Data can be stored in, for example, a table, a list, a graph, or any other suitable data structure within the database 255. The database 255 can be configured to store data and/or information associated with routing data through the edge device 200. Particularly, the database 255 can store data and/or information associated with multicast groups of the peripheral processing devices coupled to the network that includes the edge device 200. For example, the database 255 can store grouping information for the multicast groups of the peripheral processing devices. For another example, the database 255 can store information of LAGs associated with the edge devices of the network and their coupled peripheral processing devices.

In some embodiments, instructions that implement the route selection module 280 can be stored within the memory 250 and executed at the processor 260. The route selection module 280 can be, for example, a process, application, virtual machine, and/or some other software module (executing in hardware), a hardware module, or a combination of software module and hardware module. The route selection module 280 can be configured to manage route selection and data distribution for routing data through the edge device 200. For example, the route selection module 280 can select a set of edge devices to send instances of a multicast data unit to (that is, via interconnect(s) of the network). For another example, the route selection module 280 can select a port from a set of ports associated with a LAG to send a data unit to a peripheral processing device associated with the LAG via the selected port.

In some embodiments, the route selection module 280 can be implemented as, within the memory 250, a non-transitory processor-readable medium that stores code representing instructions to be executed by the processor 260. Particularly, some of the instructions can be executed such that the route selection module 280 of the edge device 200 can, among other operations, perform a method for distributing multicast data across links included in a LAG. Details of such operations are further described below and with respect to FIGS. 3-4.

Returning to FIG. 1, the network 100 can be configured to distribute multicast data across links of a LAG based on a load balancing mechanism. In some embodiments, a multicast group of peripheral processing devices can be associated with, for example, a common virtual local area network (VLAN). Each peripheral processing device from the multicast group of peripheral processing devices can be coupled to the network 100 via a LAG connection and/or a non-LAG connection. For example, the peripheral processing devices 112-118 can be included in a VLAN associated with a department of a company. Thus, each peripheral processing device 112-118 can send data to the remaining peripheral processing devices of the VLAN using a multicast mechanism.

In an example of FIG. 1, the peripheral processing device 112 defines a data unit (e.g., a data packet, data cell, data frame, etc.) that is destined to a multicast group including the peripheral processing devices 114, 116 and 118. Such a multicast group includes LAG connections (i.e., the connections via the ports P1, P2, P3 and P7 that are associated with the LAG 150) and non-LAG connections (i.e., the connections via the ports P5 and P6). The data unit can include information indicating the destined multicast group of the peripheral processing devices 114, 116 and 118 in, for example, a header of the data unit. For example, the header of the data unit can include a multicast address associated with the multicast group of peripheral processing devices 114, 116 and 118. The peripheral processing device 112 then sends the data unit to the edge device 182 via the port P4.

In response to receiving the data unit, the edge device 182 can examine the data unit to determine the destination(s) of the data unit. Based on the information (e.g., the multicast address) included in the data unit (e.g., in the header of the data unit), the edge device 182 can determine that the data unit is a multicast data unit addressed to the peripheral processing device 114, 116 and 118. Furthermore, the edge device 182 can determine that the data unit is to be sent to the peripheral processing device 114 from the edge device 184 or 186 via the LAG 150. In some embodiments, the edge device 182 can determine the destined multicast group of peripheral processing devices and the associated LAG(s) based on data and/or information associated with the multicast group. Such data and/or information can be stored in, for example, a database within a memory (e.g., the database 255 in the memory 250 in FIG. 2) of the edge device 182. For example, the database can store a first table that maps each multicast address to the peripheral processing devices (e.g., the peripheral processing devices 114, 116, 118) within the multicast group represented by that multicast address. The database can also store a second table that identifies each peripheral processing device that is connected to the network 100 via a LAG. Thus, based on such two tables, the edge device 182 can determine that the multicast data unit is destined to the peripheral processing devices 114, 116, 118, and the multicast data unit is to be sent to the peripheral processing device 114 via the LAG 150.

After determining the destined peripheral processing devices for the data unit, the edge device 182 can determine a destined edge device set to which to send instances (i.e., copies) of the data unit. When each peripheral processing device from the destined peripheral processing devices is coupled to the network 100 via a single edge device, the destined edge device set is a deterministic set that includes the edge devices that couple the destined peripheral processing devices to the network 100. For example, if the destined peripheral processing devices are the peripheral processing devices 116 and 118, the destined edge device set includes the edge devices 186 and 188.

In some embodiments, when the destined peripheral processing devices are not associated with any LAG (i.e., none of the destined peripheral processing devices is connected to the network 100 via a LAG), the destined edge device set can include edge devices that couple the destined peripheral processing devices to the network 100. Such a destined edge device set can be a deterministic set or selected from a group of potential edge device sets. For example, if the destined peripheral processing devices include the peripheral processing devices 116, 118 and the peripheral processing device 118 is coupled to another edge device not shown in FIG. 1, then the destined edge device set can include the edge device 186, and at least one of the edge device 188 or the other edge device (or both of the edge device 188 and the other edge device).

When at least one peripheral processing device from the destined peripheral processing devices is coupled to the network 100 via more than one edge device (e.g., via a LAG across multiple edge devices), the destined edge device is selected from a group of potential edge device sets. Each edge device set from the group of potential edge device sets includes at least one edge device that couples the peripheral processing device, which is coupled to the network 100 via more than one edge device, to the network 100. Thus, regardless of which edge device set is selected from the potential edge device sets, each destined peripheral processing device can be coupled to at least one edge device from the selected edge device set. For example, if the peripheral processing device 114 is the destined peripheral processing device, an edge device set can be selected from a first potential edge device set including the edge device 184 only, a second potential edge device set including the edge device 186 only, and a third potential edge device set including both the edge devices 184 and 186. As a result, the selected edge device set includes at least one edge device (the edge device 184 or 186) that is coupled to the peripheral processing device 114.

In the example of FIG. 1, because the destined peripheral processing devices include the peripheral processing devices 114, 116 and 118, the group of potential edge device sets includes a first potential edge device set including the edge devices 186, 188, and a second potential edge device set including the edge devices 184, 186 and 188. As a result, regardless of which potential edge device set is selected, each destined peripheral processing device is coupled to at least one edge device from the selected edge device set. Specifically, the peripheral processing devices 116 and 118 are coupled to the edge devices 186 and 188, respectively, regardless of which of the first potential edge device set or the second potential edge device set is selected. The peripheral processing device 114 is coupled to the edge device 186 when the first potential edge device set is selected, or coupled to both the edge devices 184 and 186 when the second potential edge device set is selected.

In some embodiments, the edge device 182 can execute a route selection module (e.g., the route selection module 280 in FIG. 2) to select an edge device set from a group of potential edge device sets associated with the destined peripheral processing devices 114, 116 and 118. In some embodiments, information of the group of potential edge device sets can be stored in the database within the memory of the edge device 182. Such information can be associated, in the database, with the multicast group of the peripheral processing devices 114, 116, 118 (e.g., the multicast address or other identifier of that multicast group). In such embodiments, the group of potential edge device sets can be determined based on the multicast address or other identifier of the multicast group.

In some other embodiments, destined edge device(s) can be determined separately for each destined peripheral processing device. For example, the route selection module can determine the edge device 186 as the destined edge device for the peripheral processing device 116. Similarly, the route selection module can determine the edge device 188 as the destined edge device for the peripheral processing device 118. Furthermore, the route selection module can select an edge device set for the peripheral processing device 114 from a first potential edge device set including the edge device 186 only, a second potential edge device set including the edge device 184 only, and a third potential edge device set including the edge devices 184 and 186. The selected edge device set (e.g., the edge device 184 only, the edge device 186 only, or both edge devices 184 and 186) for the peripheral processing device 114 can then be combined with the destined edge devices for the peripheral processing devices 116 and 118 to define the destined edge device set for the destined peripheral processing devices 114, 116 and 118. As a result of the combining, the destined edge device set includes the edge devices 186 and 188 only (that is, excluding the edge device 184), or the edge devices 184, 186 and 188.

In some embodiments, the route selection module of the edge device 182 can use a hash function to select an edge device set from a group of potential edge device sets. For example, the route selection module can use a header portion of the data unit as an input to the hash function, and the result of the hash function can be used to select (e.g., by comparing the result with a predefined threshold) one edge device set from the two potential edge device sets associated with the peripheral processing devices 114-118 (i.e., the first potential edge device set including the edge devices 186 and 188 only, and the second potential edge device set including the edge devices 184, 186 and 188). In some embodiments, the route selection module can use any other portion of the data unit, a random number, or any other arbitrary data as the input to execute the hash function. In other embodiments, the route selection module of the edge device 182 can use any other suitable method (e.g., a round robin selection scheme, selection based on a random number, etc.) to determine the destined edge device set by selecting an edge device set from the group of potential edge device sets.

In some embodiments, as a result of the operations performed at the route selection module of the edge device 182, each edge device set from the group of potential edge device sets can be selected with a substantially equal probability. In other embodiments, factors associated with the network status such as loads of the links, usage of the edge devices, bandwidth at the interconnects, etc., can be considered in selecting the edge device set. For example, if the edge device 184 is heavily occupied by other traffic, the edge device set excluding the edge device 184 can be selected with a higher probability than the probability for selecting the edge device set including the edge device 184. Thus, an overall load balancing can be achieved across edge devices and other devices (e.g., interconnects) within the network 100.

After determining a destined edge device set for the data unit, the edge device 182 can define multiple instances (e.g., copies) of the data unit, and send each instance of the data unit to each edge device from the destined edge device set via the interconnects 120 and/or 130. Specifically, the edge device 182 can send an instance of the data unit to the edge device 186 via the interconnect 130, and send an instance of the data unit to the edge device 188 via the interconnect 120 or 130. Additionally, when the edge device 184 is included in the selected edge device set, the edge device 182 can send an instance of the data unit to the edge device 184 via the interconnect 120.

In some embodiments, in defining the instances of the data unit, the edge device 182 can amend each instance of the data unit to include an identifier associated with the selected edge device set. Such an identifier can indicate the selected edge device set to the destined edge devices, such that each destined edge device can determine which other edge device(s) also receive an instance of the data unit. In some embodiments, such an identifier can be included in, for example, a field within a header portion or any other suitable portion of the instance of the data unit.

In some embodiments, an identifier associated with an edge device set can be a predefined code representing that edge device set. The predefined codes for the potential edge device sets can be stored in a memory (e.g., in the database 255 within the memory 250 in FIG. 2) at each edge device. The potential edge device sets are determined based on the LAG(s) implemented at the network 100. In the example of FIG. 1, at least a first predefined code for the edge device set including the edge devices 184, 186, 188 and a second predefined code for the edge device set including the edge devices 186, 188 can be stored at each edge device 182-188. Thus, the edge device 182 can include the predefined code for the selected edge device set in each instance of the data unit that is sent to the edge devices 186, 188 and/or 184. The edge devices 186, 188 and/or 184 can determine the selected edge device set based on the predefined code included in the received instance of the data unit, and the locally-stored predefined codes. In other embodiments, an identifier associated with an edge device set can include identifications (e.g., a serial number, a code, a name, etc.) representing each edge device included in the edge device set, and/or other type of data that can be used to identify the edge device set.

In some embodiments, an identifier associated with a selected edge device set can include information used for identifying the edge device(s) that are associated with the LAG(s), which can vary among the potential edge device sets. Such an identifier is not required to include information used for identifying the edge device(s) that are not associated with the LAG(s), which are the same across the potential edge device sets. In the example of FIG. 1, the identifier included in the instances of the data unit defined at the edge device 182 can include information associated with the edge device 186 and/or the edge device 184, such that the receiving edge devices (i.e., the edge devices 186, 188 and/or 184) can determine which edge device(s) associated with the LAG 150 is selected. Furthermore, the identifier is not required to include information for the edge device 188 (and/or the edge device 186) because the edge device 188 is included in both of the potential edge device sets.

After an edge device (e.g., the edge device 184, 186 or 188) receives an instance of the data unit, the edge device can determine, based on the information included in the received instance of the data unit (e.g., in a head portion of the instance of the data unit), the destined peripheral processing device(s) coupled to that edge device. Furthermore, when the edge device is not coupled to the destined peripheral processing device(s) via any LAG, the edge device can send the instance of the data unit to the destined peripheral processing device(s) without selecting a port from a set of ports associated with any LAG. For example, based on a received instance of the data unit, the edge device 188 can determine that the received instance of the data unit is destined to the peripheral processing device 118. The edge device 188 can then send the instance of the data unit to the peripheral processing device 118 via the port P6. For another example, based on a received instance of the data unit, the edge device 186 can determine that the received instance of the data unit is destined to the peripheral processing devices 114 and 116. The edge device 186 can then send the instance of the data unit to the peripheral processing device 116 via the port P5.

In some embodiments, based on the identifier included in the received instance of the data unit, the edge device can determine which edge device set receives instances of the data unit, thus to determine which other edge device(s) receive the instances of the data unit. For example, if an identifier associated with the edge device set including the edge devices 184, 186 and 188 is included in an instance of the data unit that is received at the edge device 186, the edge device 186 can determine, based on that identifier, that the edge device 184 also receives an instance of the data unit. For another example, if an identifier associated with the edge device set including the edge devices 186 and 188 but excluding the edge device 184 is included in an instance of the data unit that is received at the edge device 186, the edge device 186 can determine, based on that identifier, that the edge device 184 did not receive an instance of the data unit.

Based on the information inferred (or derived) from the instance of the data unit, if an edge device determines that it is coupled to a destined peripheral processing device without using a link from any LAG, and no other edge device included in the destined edge device set is coupled to that destined peripheral processing device, the edge device can forward the instance of the data unit to that destined peripheral processing device. In the example of FIG. 1, upon determining that it is the only edge device from the destined edge device set that is coupled to the peripheral processing device 118, the edge device 188 can forward the instance of the data unit to the peripheral processing device 118. Similarly, upon determining that it is the only edge device from the destined edge device set that is coupled to the peripheral processing device 116, the edge device 186 can forward the instance of the data unit to the peripheral processing device 116.

When an edge device determines that it is coupled to a destined peripheral processing device via at least one link from a LAG, the edge device can execute a route selection module (e.g., the route selection module 280 in FIG. 2) to select a port from a set of ports associated with the LAG. As a first step, the edge device can execute the route selection module to determine an appropriate selection method. In some embodiments, the route selection module can select a selection method from a set of potential selection methods, where each selection method from the set of potential selection methods is associated with an edge device set from the group of potential edge device sets. Furthermore, each selection method can be used to select a port from a set of ports, which are associated with the LAG and included in the edge devices from the edge device set associated with that selection method. As a result, the port selected by the selection method can be used to send data to a destined peripheral processing device via a link from the LAG.

In the example of FIG. 1, a set of selection methods associated with the destined peripheral processing devices 114, 116 and 118 includes two potential selection methods: a first selection method that is associated with a first edge device set including the edge devices 186 and 188, and a second selection method that is associated with a second edge device set including the edge devices 184, 186 and 188. The first selection method can be used to select a port from the ports that are associated with the LAG 150 and included in the edge devices from the first edge device set. In other words, the first selection method can be used to select a port from the ports P3 and P7. Similarly, the second selection method can be used to select a port from the ports that are associated with the LAG 150 and included in the edge devices from the second edge device set. In other words, the second selection method can be used to select a port from the ports P1, P2, P3 and P7.

In some embodiments, the route selection module of the edge device can determine, based on the identifier of the edge device set included in the instance of the data unit, the selection method that is associated with the edge device set indicated by that identifier, as discussed in further detail below. For example, based on the identifier associated with the first edge device set (i.e., the edge devices 186 and 188) that is included in the instance of the data unit received at the edge device 186, the router selection module of the edge device 186 can select the first selection method that is associated with the first edge device set. Similarly, based on the identifier associated with the second edge device set (i.e., the edge devices 184, 186 and 188) that is included in the instance of the data unit received at the edge device 186, the router selection module of the edge device 186 can select the second selection method that is associated with the second edge device set.

Note that in the example described herein, as the multicast group including the peripheral processing device 116, the edge device 186 is included in both the first edge device set and the second edge device set, while the edge device 184 is included in the second edge device set only. Thus, when receiving an instance of the data unit destined to this multicast group, the edge device 186 can select a selection method from the first selection method and the second selection method. When receiving an instance of the data unit destined to this multicast group, the edge device 184 can use the second selection method without making a selection.

For another example, when a destined multicast group includes the peripheral processing device 114 but excludes the peripheral processing device 116, the edge device 184 can select a selection method from a first selection method associated with a first edge device set including the edge device 184 and excluding the edge device 186, and a second selection method associated with a second edge device set including both the edge devices 184 and 186. Similarly, the edge device 186 can select a selection method from the second selection method and a third selection method associated with a third edge device set including the edge device 186 and excluding the edge device 184.

In some embodiments, a selection method selected and executed at a router selection module of an edge device can include, for example, a hash function, a round robin selection, and/or any other method that can be used to select a port from a set of ports associated with the LAG. Furthermore, each edge device associated with the LAG can use the same selection method such that the same port can be selected from the set of ports associated with the LAG by using the same selection method on the instances of the data unit at the different edge devices. In some embodiments, a selection method can be designed to select each port from the set of ports with a substantially equal probability. In other embodiments, factors associated with the status of the ports and/or status of the edge devices can be considered to cause unequal probabilities for selecting the ports. For example, if the links associated with the ports P1 and P2 have a larger bandwidth than the links associated with the ports P3 and P7, the selection method can be designed to select the ports P1 and P2 with a higher probability than the probability for selecting the ports P3 and P7. Thus, an overall load balancing and optimization (or substantial optimization) in performance can be achieved across the multiple links of the LAG.

For example, when the second edge device set (i.e., the edge devices 184, 186 and 188) is selected at the edge device 182, an instance of the data unit including the identifier associated with the second edge device set is sent to each of the edge devices 184, 186 and 188. Upon determining the second edge device set based on the identifier, the edge device 186 selects the second selection method, which is a hash function. The edge device 186 then executes the hash function to take a portion of the instance of the data unit received at the edge device 186 as an input, and then generate a result. The edge device 186 then selects, based on the result (e.g., comparing the result with a set of predefined thresholds), a port from the ports P1, P2, P3 and P7 that are associated with the LAG 150 and from the edge devices of the second edge device set.

Similarly, upon determining the second edge device set based on the identifier, the edge device 184 executes the same hash function to take the same portion of the instance of the data unit received at the edge device 184 as an input, and then generate a result. The portion of the instance of the data unit is identical across instances of the data unit that are sent from the edge device 182. Thus, the result generated by the hash function at the edge device 184 is the same as the result generated by the same hash function at the edge device 186. Consequently, the edge device 184 selects, based on the same result, the same port from the ports P1, P2, P3 and P7 that are associated with the LAG 150 and from the edge devices of the second edge device set. As such, the edge device 184 and the edge device 186 execute the same hash function to select the same port from the ports P1, P2, P3 and P7 to forward the data to the peripheral processing device 114.

For another example, when the first edge device set (i.e., the edge devices 186 and 188, but not the edge device 184) is selected at the edge device 182, an instance of the data unit including the identifier associated with the first edge device set is sent to each of the edge devices 186 and 188. Upon determining the first edge device set based on the identifier, the edge device 186 selects the first selection method, which is a round robin selection method. The edge device 186 then executes the round robin selection method to select, based on the received instance of the data unit and/or other information, a port from the ports P3 and P7 that are associated with the LAG 150 and from the edge devices of the first edge device set.

After a port associated with the LAG is selected at an edge device associated with the LAG, the edge device can determine whether to forward the instance of the data unit to the peripheral processing device associated with the LAG. Specifically, if the selected port is a port of the edge device, the edge device forwards the instance of the data unit to the peripheral processing device via the selected port. Otherwise, if the selected port is not a port of the edge device (i.e., the selected port is a port of another edge device associated with the LAG), the edge device refrains from forwarding the instance of the data unit to the peripheral processing device. Furthermore, in some embodiments, the edge device drops the instance of the data unit if the edge device determines not to forward the instance of the data unit to any peripheral processing device.

In the example of FIG. 1, if the port P3 or P7 is selected at each of the edge devices 184 and 186 by executing the selection method (e.g., the hash function) associated with the second edge device set (i.e., the edge devices 184, 186 and 188), the edge device 186 forwards the instance of the data unit to the peripheral processing device 114 via the selected port P3 or P7, and the edge device 184 refrains from forwarding the instance of the data unit to the peripheral processing device 114. In some instances, the edge device 184 can drop the instance of the data unit. Otherwise, if the port P1 or P2 is selected at each of the edge devices 184 and 186, the edge device 184 forwards the instance of the data unit to the peripheral processing device 114 via the selected port P1 or P2, and the edge device 186 refrains from forwarding the instance of the data unit to the peripheral processing device 114. Note that because the port P5 is the only port that connects the peripheral processing device 116 to the network 100, an instance of the data unit can be sent to the peripheral processing device 116 via the port P5 regardless of the selection result associated with the LAG 150.

Figure 3:
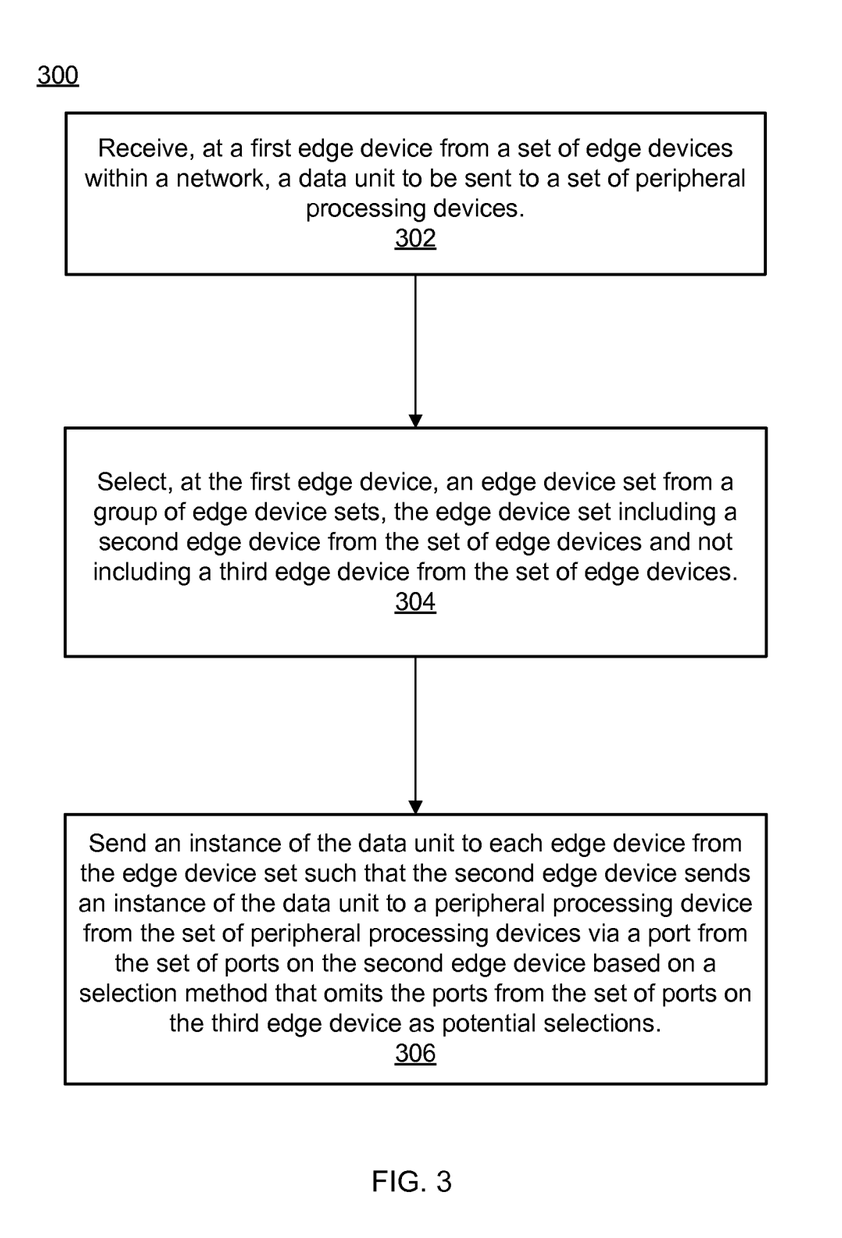
FIG. 3 is a flow chart illustrating a method for distributing traffic to a set of edge devices, according to an embodiment.

FIG. 3 is a flow chart illustrating a method 300 for distributing traffic to a set of edge devices, according to an embodiment. The method 300 can be executed at a first edge device that is structurally and functionally similar to the edge device 182 and the edge device 200 shown and described with respect to FIGS. 1 and 2. Particularly, the first edge device can be included in a network similar to the network 100 in FIG. 1. The first edge device can couple a first peripheral processing device (e.g., the peripheral processing device 112 in FIG. 1) to the remaining components of the network (e.g., via a distributed multi-stage switch) including a group of edge devices that are coupled to a second peripheral processing device (e.g., the peripheral processing device 114 in FIG. 1) via a LAG (e.g., the LAG 150 in FIG. 1). The group of edge device includes a second edge device and a third edge device. The first edge device can include a processor (e.g., the processor 260 of the edge device 200 in FIG. 2) and memory (e.g., the memory 250 of the edge device 200 in FIG. 2). The memory can be, for example, a non-transitory processor-readable medium. The code representing instructions to perform the method 300 can be stored in the non-transitory processor-readable medium of the first edge device, and executed by the processor of the first edge device. The code includes code to be executed by the processor of the first edge device to cause the first edge device to operate the functions illustrated in FIG. 3 and described as follows.

At 302, the first edge device can receive, from the first peripheral processing device, a data unit (e.g., a data packet, a data cell, a data frame, etc.) to be sent to a set of peripheral processing devices. In some embodiments, each peripheral processing device from the set of peripheral processing devices can be associated with a multicast group such as a common VLAN. Furthermore, the set of peripheral processing devices can include the second peripheral processing device that is operatively coupled to the network via the LAG. The LAG can be associated with a set of ports on the second edge device and a set of ports on the third edge device.

At 304, the first edge device can select an edge device set from a group of edge device sets. Each edge device set from the group of edge device sets can be associated with the set of peripheral processing devices. Specifically, each peripheral processing device from the set of peripheral processing devices is coupled to the network via at least one edge device from each edge device set from the group of edge device sets. Particularly, as the set of peripheral processing devices including the second peripheral processing device, each edge device set from the group of edge device sets includes at least one of the second edge device or the third edge device. That is, each edge device set from the group of edge device sets is an edge device set that (1) includes the second edge device and excludes the third edge device, (2)

includes the third edge device and excludes the second edge device, or (3) includes both the second edge device and the third edge device. For example, the first edge device selects an edge device set that includes the second edge device and excludes the third edge device.

As described with respect to FIG. 1, the first edge device can select the edge device set from the group of edge device sets using, for example, a hash function, a round robin selection, and/or any other suitable selection method. In some embodiments, each edge device set from the group of edge device sets is different from the remaining edge device sets from the group of edge device sets. In some embodiments, the first edge device can select the edge device set without selecting a port from the set of ports on the second edge device.

At 306, the first edge device can send an instance of the data unit to each edge device from the edge device set such that the second edge device sends an instance of the data unit to the second peripheral processing device via a port from the set of ports on the second edge device based on a selection method that omits the ports from the set of ports on the third edge device as potential selections.

As described with respect to FIG. 1, the selection method can be selected from multiple potential selection methods, each of which is associated with a potential edge device set from the group of edge device sets. In some embodiments, prior to sending the instance of the data unit, the first edge device can amend, based on selecting the edge device set from the group of edge device sets, the instance of the data unit to include an identifier associated with the edge device set. In such embodiments, the first edge device can send the instance of the data unit including the identifier to each edge device from the selected edge device set such that the second edge device selects the selection method from the group of potential selection methods based on the identifier.

Thus, the selection method used at the second edge device is associated with an edge device set from the group of edge device sets that includes the second edge device and excludes the third edge device. As a result, the selection method includes the set of ports of the second edge device as potential selections, but omits the set of ports of the third edge device as potential selections. Consequently, a port from the set of ports of the second edge device can be selected by the selection method as the port from which the instance of the data unit is sent to the second peripheral processing device. On the contrary, a port from the set of ports of the third edge device will not be selected by the selection method as the port from which the instance of the data unit is sent to the second peripheral processing device. In some embodiments, the selection method can include, for example, a hash function with each port from the set of ports on the second edge device being the potential selections and not the set ports on the third edge device as the potential selections.

Figure 4:
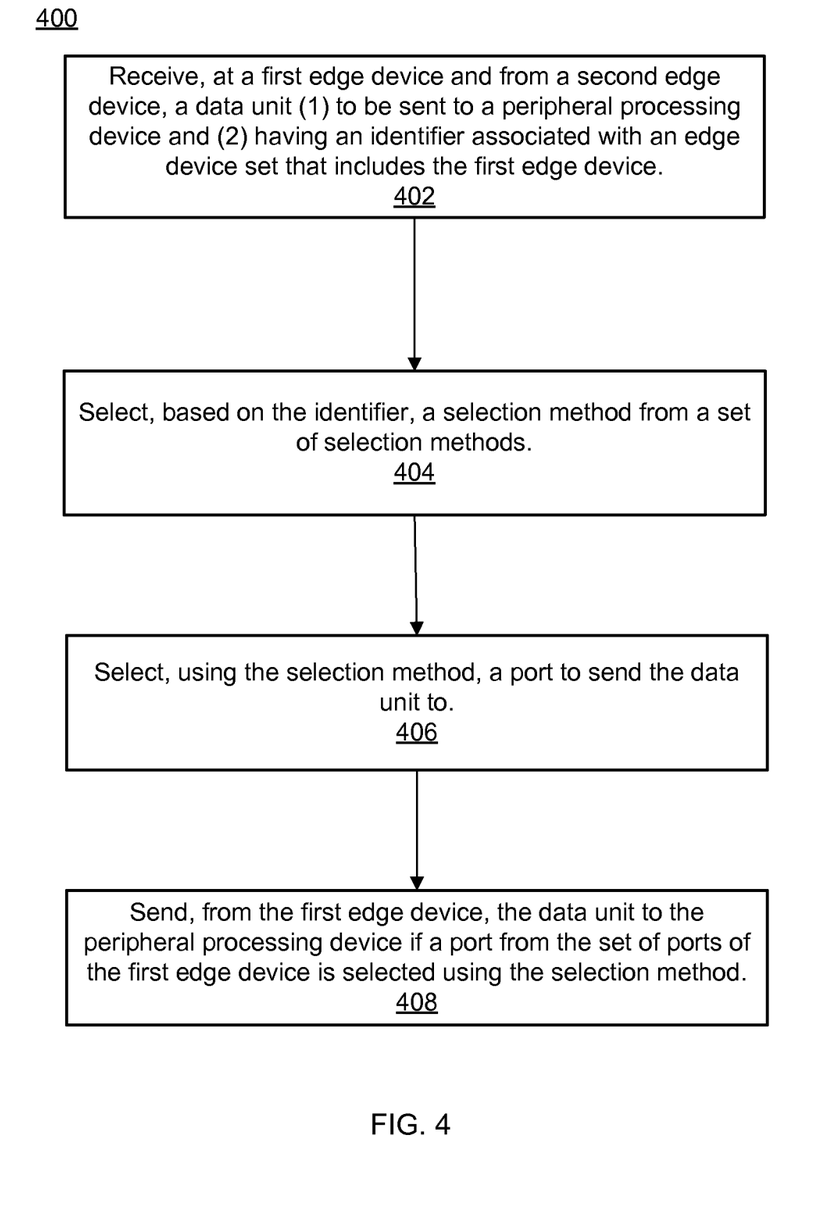
FIG. 4 is a flow chart illustrating a method for forwarding a data unit at an edge device, according to an embodiment.

FIG. 4 is a flow chart illustrating a method 400 for forwarding a data unit at an edge device, according to an embodiment. The method 400 can be executed at a first edge device that is structurally and functionally similar to the edge device 184, 186, and the edge device 200 shown and described with respect to FIGS. 1 and 2. Particularly, the first edge device can be included in a network similar to the network 100 in FIG. 1. The first edge device, together with a second edge device (e.g., the edge device 184, 186 in FIG. 1), can be coupled to a peripheral processing device (e.g., the peripheral processing device 114 in FIG. 1) via a LAG (e.g., the LAG 150 in FIG. 1). Specifically, the first edge device can have a set of ports configured to be associated with the LAG. The LAG can also be associated with a set of ports on the second edge device. Thus, the LAG can operatively couple the peripheral processing device with the first edge device (via the set of ports of the first edge device) and the second edge device (via the set of ports of the second edge device).

The first edge device can include a processor (e.g., the processor 260 of the edge device 200 in FIG. 2) and memory (e.g., the memory 250 of the edge device 200 in FIG. 2). The memory can be, for example, a non-transitory processor-readable medium. The code representing instructions to perform the method 400 can be stored in the non-transitory processor-readable medium of the first edge device, and executed by the processor of the first edge device. The code includes code to be executed by the processor of the first edge device to cause the first edge device to operate the functions illustrated in FIG. 4 and described as follows.

At 402, the first edge device can receive, from a third edge device, a data unit (e.g., a data packet, a data cell, a data frame, etc.) to be sent to the peripheral processing device. The data unit can include an identifier associated with an edge device set that includes the first edge device. The edge device set can optionally include the second edge device. In some embodiments, the data unit can be a multicast data unit associated with a multicast group that includes the peripheral processing device.

At 404, the first edge device can select, based on the identifier, a selection method from a set of selection methods. The selection method can be associated with the edge device set indicated by the identifier. The selection method can be used to select a port, via which to send the data unit to the peripheral processing device. Note that each selection method from the set of selection methods includes the set of ports of the first edge device as the potential selections because the data unit is received at the first edge device, and the first edge device is therefore one of the potential edge devices that can send the data unit to the peripheral processing device.

For example, if the edge device set associated with the identifier does not include the second edge device, the first edge device can select a first selection method that includes the set of ports of the first edge device as potential selections and omits the set of ports of the second edge device as potential selections. In some instances, such a first selection method can include a hash function having each port from the set of ports on the first edge device as the potential selections, but excluding the set ports on the second edge device as the potential selections.

For another example, if the edge device set associated with the identifier includes the second edge device, the first edge device can select a second selection method that includes both the set of ports of the first edge device and the set of ports of the second edge device as potential selections. In some instances, such a second selection method can include a hash function having each port from the set of ports on the first edge device and each port from the set of ports on the second edge device as potential selections.

At 406, the first edge device can select, using the selection method, a port to which to send the data unit. For example, if the first selection method is selected (i.e., the edge device set associated with the identifier does not include the second edge device), the first edge device can select, using the first selection method, a port from a group of ports including the set of ports of the first edge devices and excluding the set of ports of the second edge device. Thus, a port from the set of ports of the first edge device may be selected, but no port from the set of ports of the second edge device can be selected. For another example, if the second selection method is selected (i.e., the edge device set associated with the identifier includes the second edge device), the first edge device can select, using the second selection method, a port from a group of ports including both the set of ports of the first edge devices and the set of ports of the second edge device. Thus, a port from the set of ports of the first edge device or a port from the set of ports of the second edge device may be selected.

At 408, if a port from the set of ports of the first edge device is selected based on the selection method (e.g., the first selection method, the second selection method), the first edge device can send the data unit to the peripheral processing device via the selected port. Otherwise, if no port from the set of ports of the first edge device is selected based on the selection method (e.g., the first selection method, the second selection method), the first edge device can refrain from sending the data unit to the peripheral processing device. Furthermore, the first edge device can drop the data unit. Similarly, if a port from the set of ports of the second edge device is selected based on the selection method (e.g., the second selection method), the second edge device can send a data unit, which is received at the second edge device and a copy (e.g., a multicast copy) of the data unit received at the first edge device, to the peripheral processing device via the selected port.

While shown and described above with respect to FIGS. 1-4 as distributing multicast data within a network (e.g., the network 100 in FIG. 1) and load balancing links of a LAG, in other embodiments, the same method or a similar method can be used to distribute other types of data (e.g., unicast data, broadcast data) and load balance links of a LAG. For example, as shown in FIG. 1, when a unicast data unit is sent from the peripheral processing device 112 to the peripheral processing device 114, a similar method can be applied at the edge devices 182, 184 and/or 186 to route the unicast data unit. Specifically, the edge device 182 can determine to send the unicast data unit to the edge device 184 or the edge device 186. After receiving the unicast data unit, the edge device 184 or the edge device 186 can use a selection method to select a port from a set of ports associated with the LAG 150. That is, if the unicast data unit is sent to the edge device 184, the edge device 184 can use the selection method to select a port from the ports P1 and P2; if the unicast data unit is sent to the edge device 186, the edge device 186 can use the selection method to select a port from the ports P3 and P7. As a result, the edge device 184 or the edge device 186 can send the unicast data unit to the peripheral processing device via the selected port associated with the LAG 150.

While shown and described above with respect to FIGS. 1-4 as distributing multicast data across links of a single LAG, in other embodiments, the same method can be used to distribute multicast data or other types of data (e.g., broadcast data) across multiple LAGs. In such embodiments, each edge device set determined at an ingress edge device (e.g., the edge device 182 as described with respect to FIG. 1) can include a first subset of edge devices used to route the data unit through a first LAG, and a second subset of edge devices used to route the data unit through a second LAG. The same method described herein can be used to separately determine the subset of edge devices for each LAG, and to separately select ports associated with the LAGs at each associated edge device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. An apparatus, comprising:
a first edge device configured to be included in a plurality of edge devices and configured to be operatively coupled to the remaining edge devices from the plurality of edge devices, the first edge device configured to receive a data unit to be sent to a peripheral processing device operatively coupled to the first edge device via a link aggregation group (LAG) associated with a set of ports on a second edge device from the plurality of edge devices and a set of ports on a third edge device from the plurality of edge devices,
the first edge device configured to amend, based on selecting an edge device set from a plurality of edge device sets, an instance of the data unit to include an identifier associated with the edge device set, the edge device set including the third edge device, the first edge device configured to send the instance of the data unit including the identifier to each edge device associated with the edge device set such that the third edge device (1) selects a selection method from a plurality of selection methods based at least in part on the identifier and (2) sends the data unit to the peripheral processing device via a port from the set of ports on the third edge device based at least in part on the selection method and the second edge device not being within the edge device set.

2. The apparatus of claim 1, wherein the first edge device is configured to send the instance of the data unit to each edge device associated with the edge device set via a network interconnect.

3. The apparatus of claim 1, wherein the first edge device is configured to select the edge device set in response to receiving the data unit.

4. The apparatus of claim 1, wherein the selection method omits the set of ports on the second edge device as potential selections.

5. The apparatus of claim 1, wherein the first edge device is configured to send the instance of the data unit to the third edge device such that the third edge device sends the data unit to the peripheral processing device via the port from the set of ports on the third edge device based at least in part on a hash function with the set of ports on the third edge device being the potential selections and not the set of ports on the second edge device as the potential selections.

6. The apparatus of claim 1, wherein the first edge device is configured to send the instance of the data unit to each edge device associated with the edge device set via at least one distributed multi-stage switch.

7. A method, comprising:
receiving, at a first edge device, a data unit to be sent to a peripheral processing device operatively coupled to a second edge device, a third edge device and a fourth edge device via a link aggregation group (LAG) associated with a set of ports on the second edge device, a set of ports on the third edge device and a set of ports on the fourth edge device;
selecting, at the first edge device, an edge device set including the third edge device and the fourth edge device, the edge device set not including the second edge device; and
sending an instance of the data unit to each edge device from the edge device set such that the third edge device sends the data unit to the peripheral processing device via a port from the set of ports on the third edge device based on a selection method that (1) includes as potential selections each port from the set of ports on the third edge device and each port from the set of ports on the fourth edge device and (2) omits the set of ports on the second edge device as potential selections.

8. The method of claim 7, wherein the selecting includes selecting the edge device set without selecting a port from the set of ports on the third edge device.

9. The method of claim 7, wherein the selection method includes a hash function with each port from the set of ports on the third edge device and each port from the set of ports on the fourth edge device being the potential selections and not the set of ports on the second edge device as the potential selections.

10. The method of claim 7, wherein the edge device set is from a plurality of edge device sets, each edge device set from the plurality of edge device sets is associated with a common multicast group, the data unit being associated with the common multicast group.

11. The method of claim 7, further comprising:
amending, prior to the sending and based on selecting the edge device set, the instance of the data unit to include an identifier associated with the edge device set,
the sending including sending the instance of the data unit including the identifier to each edge device from the edge device set such that the third edge device selects the selection method from a plurality of selection methods based at least in part on the identifier.

12. The method of claim 7, wherein the sending includes sending the instance of the data unit to each edge device from the edge device set via at least one distributed multi-stage switch.

13. A method, comprising:
receiving, at a first edge device, a data unit to be sent to a peripheral processing device operatively coupled to a second edge device and a third edge device via a link aggregation group (LAG) associated with a set of ports on the second edge device and a set of ports on the third edge device;
selecting, at the first edge device, an edge device set including the third edge device and not including the second edge device;
amending, based on the selecting the edge device set, an instance of the data unit to include an identifier associated with the edge device set; and
sending the instance of the data unit including the identifier to each edge device from the edge device set such that the third edge device (1) selects a selection method from a plurality of selection methods based at least in part on the identifier and (2) sends the data unit to the peripheral processing device via a port from the set of ports on the third edge device based on the selection method, the selection method omits the ports from the set of ports on the second edge device as potential selections.

14. The method of claim 13, wherein the selecting includes selecting the edge device set without selecting a port from the set of ports on the third edge device.

15. The method of claim 13, wherein the selection method includes a hash function with each port from the set of ports on the third edge device being the potential selections and not the set of ports on the second edge device as the potential selections.

16. The method of claim 13, wherein the edge device set is from a plurality of edge device sets, each edge device set from the plurality of edge device sets is associated with a common multicast group, the data unit being associated with the common multicast group.

17. The method of claim 13, wherein the sending includes sending the instance of the data unit to each edge device from the edge device set via at least one distributed multi-stage switch.

18. The method of claim 13, wherein the LAG is associated with a set of ports on a fourth edge device, the edge device set including the fourth edge device, the selection method including as potential selections each port from the set of ports on the third edge device and each port from the set of ports on the fourth edge device.

* * * * *